No. 750,567. PATENTED JAN. 26, 1904.
E. R. BARBER.
COTTON GIN.
APPLICATION FILED AUG. 20, 1902.
NO MODEL. 3 SHEETS—SHEET 1.
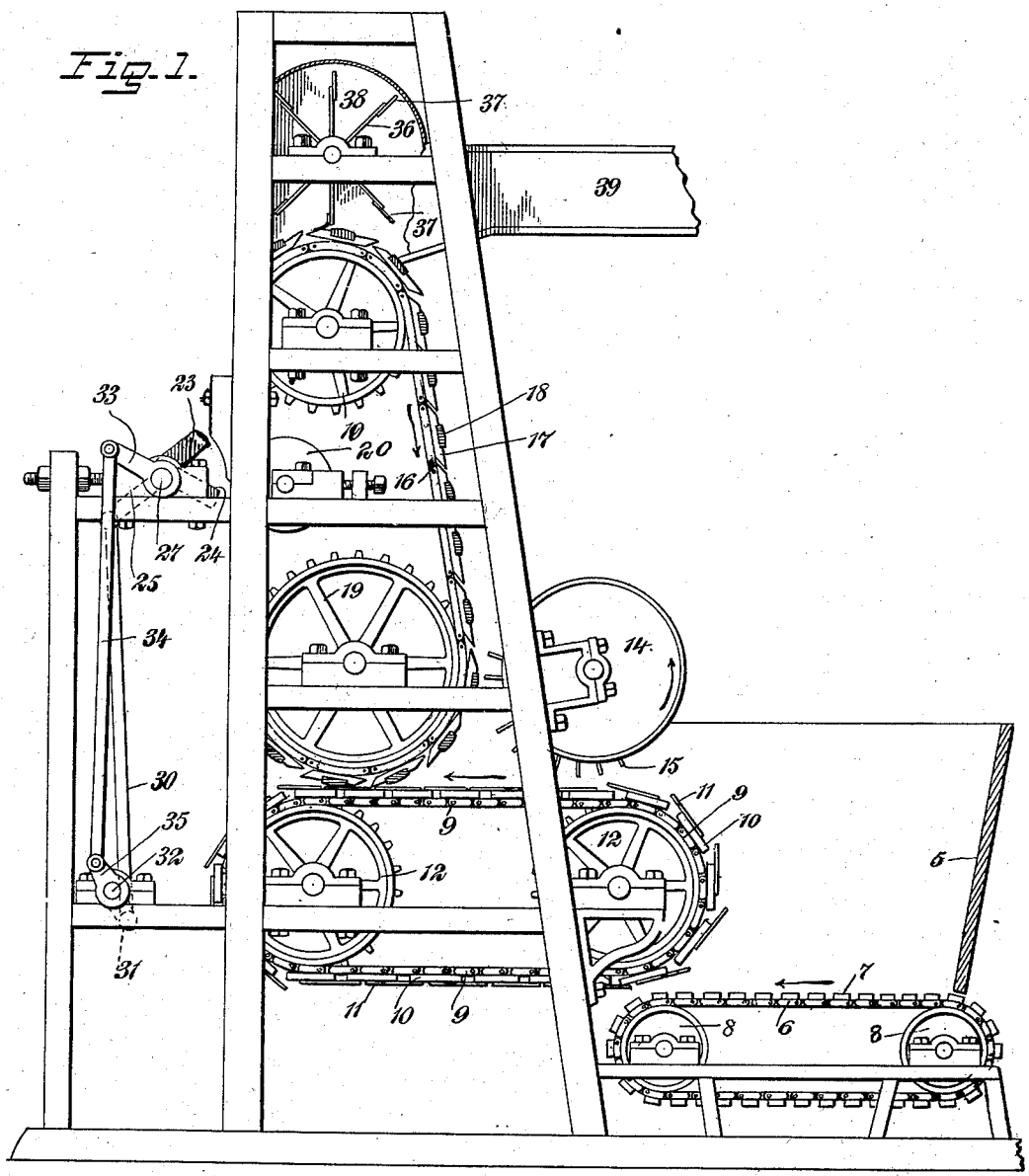
WITNESSES:
James F. Duhamel
Isaac B. Owens.
INVENTOR
Eugene R. Barber
BY Munn & Co
ATTORNEYS.

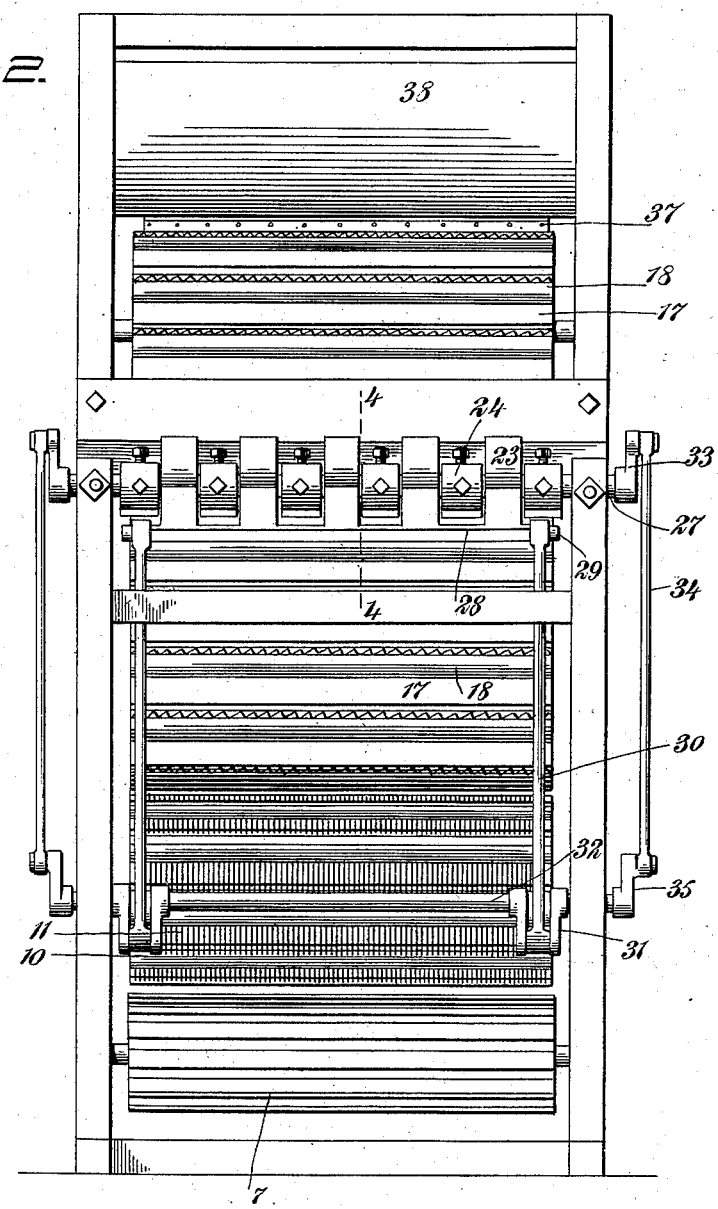

No. 750,567. PATENTED JAN. 26, 1904.
E. R. BARBER.
COTTON GIN.
APPLICATION FILED AUG. 20, 1902.
NO MODEL. 3 SHEETS—SHEET 3.
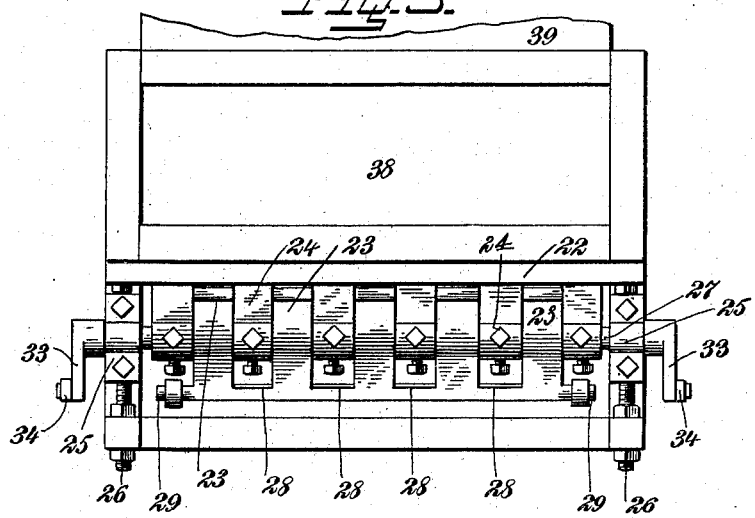
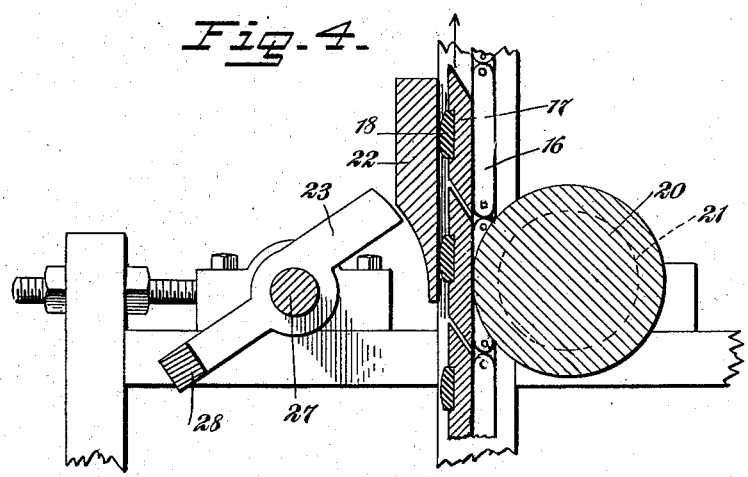
WITNESSES:
James F. Duhamel
Isaac B. Owens
INVENTOR
Eugene R. Barber
BY Munn & Co
ATTORNEYS.

No. 750,567. Patented January 26, 1904.

UNITED STATES PATENT OFFICE.

EUGENE ROBERTS BARBER, OF VALDOSTA, GEORGIA.

COTTON-GIN.

SPECIFICATION forming part of Letters Patent No. 750,567, dated January 26, 1904.

Application filed August 20, 1902. Serial No. 120,311. (No model.)

*To all whom it may concern:*

Be it known that I, EUGENE ROBERTS BARBER, a citizen of the United States, and a resident of Valdosta, in the county of Lowndes and State of Georgia, have invented a new and Improved Cotton-Gin, of which the following is a full, clear, and exact description.

This invention relates to a cotton-gin of the same general form as that disclosed in my prior patent, No. 619,116, dated February 7, 1899.

The object of the present invention is to effect various improvements in the details of the apparatus shown in my prior patent, and particularly with respect to the manner of feeding the cotton and to the devices for carrying off the cotton after it has been ginned or cleared of the seeds.

This specification is an exact description of one example of my invention, while the claims define the actual scope thereof.

Reference is to be had to the accompanying drawings, forming a part of this specification, in which similar characters of reference indicate corresponding parts in all the views.

Figure 1 is a side elevation of the invention with parts broken away. Fig. 2 is a rear elevation. Fig. 3 is a partial plan view, and Fig. 4 is a detail section on the line 4 4 of Fig. 2.

The framing of the apparatus may be of any suitable sort and will not be specifically described in this specification.

5 indicates the feed-hopper, in which the seed-cotton is placed to be operated on by the machine. The bottom of this hopper is formed by an endless belt made up of chains 6 with transverse strips or slats 7 thereon, this belt running over drums 8, suitably mounted in the framing of the gin. The inner end of the feed hopper is closed by a belt formed of chains 9, to which are fastened transverse slats 10, carrying teeth 11, as shown, these teeth extending transversely of the slats and projecting over adjacent slats, so that as the teeth turn around the drums or sprocket-wheels 12, on which said belt runs, the teeth will open and admit the cotton beneath them. Then as the belt straightens out in its run between the two sprocket-wheels or drums the teeth will close back against the adjacent slats and hold the cotton pinched tightly against the belt. One of the drums or sprocket-wheels 12 is located at the inner side of the hopper 5, and thus forms the inner wall of the hopper. As the belt turns over this drum 12 the teeth of the belt open, as above explained, and the cotton is grasped by the teeth and fastened to the belt. The belt 6 runs in the direction of the arrow shown in Fig. 1, and the belt 9 runs in the direction also indicated by the arrow in Fig. 1, so that the first-named belt serves to advance the cotton steadily toward the second belt and the second-named belt picks the cotton up and carries it out of the hopper toward the front of the machine.

14 indicates a drum mounted over the belt 9 and having retracting-teeth 15, which project from the lower side of the drum and over the belt 9, so as to carry off from the same any superfluous cotton which may be clinging lightly thereto. This drum 14 and its teeth 15 may be of any desired construction—for example, that shown in the patent to Craven, No. 176,601, dated April 25, 1876.

Mounted over the belt 9 and disposed vertically is a series of chains 16, forming a belt, and to the links of this belt are respectively fastened transverse strips 17, which have bevel side edges overlapping each other and provided with teeth in their overlapping front or leading edges, as shown in my prior patent for cotton-gins, No. 619,116, dated February 7, 1899, and which are recessed in their outer faces to receive strips 18, of leather, rubber, or other yielding material. When the belt 16 runs straight, the overlapped edges of the slats 17 lie closely together, but not necessarily engaged. When the belt turns around an abrupt curve, the edges of the slats separate and spaces are left between them into which the cotton may be introduced and held by said teeth. This belt 16 is carried on sprocket-wheels or drums 19 and is adapted to turn in the direction indicated by the arrow in Fig. 1, but faster than the belt 9. The lower drum 19 is located directly over the belt 9, and as the belt 16 turns under this lower drum 19 the slats 17 separate at their edges and the cotton held by the slats on the belt 9 is grasped by the teeth on the slats 17 and is thus carried from the belt 9 to the belt 16, which proceeds to raise the cotton to the picking devices proper, which will now be described.

As shown best in Fig. 4, the belt 16 is made up of a chain the links of which are pivotally connected together and have the slats 17 fastened thereto. This view also shows in detail the structure of the slats and the strips 18 of yielding material. Back of the belt lies a pressure-roller 20, which is formed with annular grooves 21, adapted to receive the chains which serve to make up the belt 16, so that the surface of the roller 20 bears against the slats 17 as contradistinguished from bearing against the chains.

22 indicates a stationary blade which extends transversely parallel with the roller 20, and the belt 16, with its attached parts 17 and 18, is adapted to pass between the roller and the stationary blade 22. The roller 20 serves to keep the belt pressed up snugly against the stationary blade. The cotton being held between the slats 17 is passed up and drawn against this blade 22, which serves to draw out the seeds from the cotton. This action is assisted by picking-fingers 23 and 24, said fingers working alternately past the front side of the blade around an axis longitudinally thereof. This axis is formed by a shaft 27, which is carried in boxes 25, adjustable on the frame toward and from the blade 22 by means of screws or other adjusting means 26. The shaft 27 is rockably mounted in said boxes, and the picking-fingers 24 are fastened securely thereto. The fingers 23 are mounted loosely on the shaft 27 at points intermediate the fingers 24, and their rear ends are connected by a transverse or cross piece 28, causing said fingers to move in unison. From the endwardmost fingers 23 pins 29 project, and these pins are connected with rods 30, extending down to cranks 31 on a drive-shaft 32. The ends of the shaft 27 carry crank-arms 33, and to these arms are connected rods 34, which extend downward to crank-arms 35, also on the shaft 32. These crank-arms 31 and 35 are oppositely disposed, as Fig. 1 illustrates, and upon the rotation of the shaft 32 by any improved means the shaft 27 is rocked so as to cause the fingers 24 to play back and forth over the blade 22, and the fingers 23 are also rocked; but their movement is out of time with the movement of the fingers 24, and the result is that the picking-fingers play alternately over the blade and work the seed effectually from the cotton. The strips 18 pass the blade 22, in contact therewith, and serve to hold the cotton firmly during the action of the picking-fingers 23 and 24 in removing the seed from the cotton. Said strips being yielding pass readily under the blade and do not materially retard the movement of the belt.

As the belt 16 passes upward from the blade 22 it carries with it the ginned cotton, and this cotton is held by the teeth on the belt until the belt reaches the upper drum 19, whereupon as the slats 17 open the ginned cotton is removed by the action of a fan 36, the blades of which are tipped with leather or other yielding material 37, as indicated in Fig. 1. This fan is located in a box 38, which itself communicates with a conveyer-chute 39, serving to carry off the ginned cotton to any point desired.

Various changes in the form and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. In a cotton-gin, the combination with the means for carrying the cotton, of a driven rock-shaft, a series of picking-fingers fast thereon and spaced from each other, a second series of picking-fingers mounted loosely on the shaft, respectively between the first-named picking-fingers, connections between the second-named picking-fingers to cause them to move in unison, and means for driving the second series of picking-fingers independently of the movement of the shaft.

2. In a cotton-gin, the combination of a roller having an annular groove therein, a chain running in said groove, cotton-holding means attached to said chain, a blade past which said cotton-holding means run, the roller serving to press the cotton-holding means against the blade, picking devices located adjacent to said blade, said cotton-holding means comprising transverse slats connected to the chain and having toothed edges serving to hold the cotton, and strips of relatively yielding material set into the outer faces of the slats.

3. In a cotton-gin, the cotton-carrying belt, comprising a chain or chains, transversely-disposed slats fastened thereto and having toothed edges adapted to hold the cotton, and strips of relatively yielding material set into the outer faces of the slats.

4. In a cotton-gin, the combination with the means for carrying the cotton, of a driven rock-shaft, picking-fingers carried fast thereon, additional picking-fingers loose on the rock-shaft, and means for independently driving said additional picking-fingers.

5. In a cotton-gin, the combination with the means for carrying the cotton, of a driven rock-shaft, picking-fingers fast thereon, additional picking-fingers loose on the rock-shaft, a connection between said additional picking-fingers, and means for independently driving the additional picking-fingers.

6. In a cotton-gin, the combination with the means for carrying the cotton, of a rock-shaft, picking-fingers fast thereon, additional picking-fingers loose thereon, a drive-shaft, a crank connection between the rock-shaft and drive-shaft, and a second crank connection between the drive-shaft and the said additional picking-fingers.

7. In a cotton-gin, the cotton-carrying belt, comprising slats, means for mounting the slats to form the belt, said slats engaging the cotton, substantially as described, and sections of relatively yielding material set into the surfaces of the slats.

8. In a cotton-gin, the combination of a stationary blade, picking devices working past the edges thereof, and a cotton-carrying belt moving past the blade and picking devices, and comprising slats, means to which the slats are attached, whereby to form the belt, and sections of relatively yielding material set into the faces of the slats adjacent to said blade.

9. In a cotton-gin, the combination with the ginning devices proper, of a cotton-carrying belt, comprising slats and a flexible endless member to which said slats are attached substantially as described, a conveyer-chute to which said cotton-carrying belt leads, and a fan located in proximity to the belt and blowing into the chute.

In testimony whereof I have signed my name to this specification in the presence of two subscribing witnesses.

EUGENE ROBERTS BARBER.

Witnesses:
R. D. MYDDELTON,
S. S. MYDDELTON.